(12) United States Patent
Yasuna et al.

(10) Patent No.: US 7,085,084 B2
(45) Date of Patent: Aug. 1, 2006

(54) MAGNETIC DISK APPARATUS AND SERVO PATTERN RECORDING METHOD THEREFOR

(75) Inventors: Kei Yasuna, Chiyoda (JP); Naoki Satoh, Odawara (JP); Makoto Horisaki, Odawara (JP)

(73) Assignee: Hitachi Global Storage Technologies Japan, Ltd., Odawara (JP)

( * ) Notice: Subject to any disclaimer, the term of this patent is extended or adjusted under 35 U.S.C. 154(b) by 3 days.

(21) Appl. No.: 10/682,022

(22) Filed: Oct. 10, 2003

(65) Prior Publication Data

US 2005/0052769 A1 Mar. 10, 2005

(30) Foreign Application Priority Data

Sep. 4, 2003 (JP) ............................. 2003-312233

(51) Int. Cl.
*G11B 5/09* (2006.01)
(52) U.S. Cl. ............................. 360/51; 360/48; 360/75; 360/53; 360/77.02; 360/77.04
(58) Field of Classification Search ................. 360/44, 360/77.06, 77.08, 75, 51, 77.02, 78.04
See application file for complete search history.

(56) References Cited

U.S. PATENT DOCUMENTS

| | | | | |
|---|---|---|---|---|
| 4,912,576 A | * | 3/1990 | Janz | ........................ 360/77.07 |
| 5,612,833 A | * | 3/1997 | Yarmchuk et al. | ............. 360/75 |
| 5,757,574 A | * | 5/1998 | Chainer et al. | ............... 360/75 |
| 5,907,447 A | * | 5/1999 | Yarmchuk et al. | ............. 360/75 |
| 6,005,738 A | * | 12/1999 | Chainer et al. | ................ 360/75 |
| 6,031,674 A | * | 2/2000 | Tabata | .......................... 360/57 |
| 6,101,055 A | * | 8/2000 | Chainer et al. | ............... 360/51 |
| 6,304,407 B1 | * | 10/2001 | Baker et al. | ................... 360/75 |

(Continued)

FOREIGN PATENT DOCUMENTS

JP 08-212527 A 8/1996

(Continued)

*Primary Examiner*—Wayne Young
*Assistant Examiner*—Dismery Mercedes
(74) *Attorney, Agent, or Firm*—Antonelli, Terry, Stout and Kraus, LLP.

(57) ABSTRACT

A magnetic disk apparatus and a servo pattern recording method therefor, enabling writing of servo signal with high quality, without being affected with ill influences due to fluctuation on a rotation speed when conducting the self servo write operation, comprises: a magnetic disk 102; a head 103 having a write element for use of recording information onto the magnetic disk and a read element for reproducing information from the magnetic disk; and an actuator for moving said head to a desired radial position on the magnetic disk, wherein on the magnetic disk is recorded servo patterns 110 for positioning the head on a recording surface thereof, and within each of the servo patterns are recorded, a pattern sector marker 208*a* as a marker for detecting passage time of the head, a track ID code 209, and a burst pattern 210 for use of detection of the radial position of the head, following a preamble 207*a* for use of synchronization of time-base circuit, and further recorded and disposed a second preamble 207*b* and a second sector marker 208*b*, continuously.

2 Claims, 8 Drawing Sheets

U.S. PATENT DOCUMENTS

| | | | |
|---|---|---|---|
| 6,429,989 B1 * | 8/2002 | Schultz et al. | 360/51 |
| 6,519,107 B1 * | 2/2003 | Ehrlich et al. | 360/75 |
| 6,643,082 B1 * | 11/2003 | Belser | 360/48 |
| 6,704,156 B1 * | 3/2004 | Baker et al. | 360/75 |
| 6,735,031 B1 * | 5/2004 | Chainer et al. | 360/51 |
| 6,738,205 B1 * | 5/2004 | Moran et al. | 360/17 |
| 6,738,215 B1 * | 5/2004 | Yatsu | 360/75 |
| 6,980,382 B1 * | 12/2005 | Hirano et al. | 360/31 |

FOREIGN PATENT DOCUMENTS

| | | |
|---|---|---|
| JP | 10-050014 A | 2/1998 |
| JP | 10-222943 A | 8/1998 |
| JP | 2002-319253 A | 10/2002 |

* cited by examiner

MAGNETIC DISK APPARATUS AND SERVO PATTERN RECORDING METHOD THEREFOR

BACKGROUND OF THE INVENTION

The present invention relates to a magnetic disk apparatus, such as a hard disk device, for example, and it relates to, in particular, a magnetic disk apparatus, being able to record servo signals on a disk without using an actuator and/or clock head of an outside, as well as, a method for recording servo patterns for it.

In general, in manufacturing processes of the magnetic disk apparatus, a number of servo signals (i.e., servo sectors) are recorded on the recording surface thereof, being several tens to a hundred or more per one (1) round, for enabling the position detection of a head on the magnetic disk rotating at a high speed.

Writing of such the servo sectors thereon, for defining the position in a circumferential direction on the disk, therefore, in normal, is conducted through a process, which is called by a "servo write". In such the servo write process, generally, it is conducted by using an actuator and/or a clock head of an outside, for the exclusive use of the servo write.

On the other hand, without using such the actuator and/or the clock head of an outside for the exclusive use of the servo write; i.e., with using a head of itself, which is equipped within the magnetic disk apparatus, it is already known that such the servo write as was mentioned above can be conducted, by controlling the writing position in the circumferential direction on the disk, with much flexibility, in the following patent documents:

Japanese Patent Laying-Open No. Hei 8-212529 (1996);
Japanese Patent Laying-Open No. Hei 10-50014 (1998);
Japanese Patent Laying-Open No. Hei 10-222943 (1998); and
Japanese Patent Laying-Open No. 2002-319253 (2002).

However, in the case where the servo write is conducted without using the clock head for the exclusive use thereof, it is necessary to determine timing for newly writing, upon the basis of detection times of patterns when reproducing the tracks, which are recorded on the disk, before. However, a rotation of the disk includes fluctuation in the speed thereof. For this reason, looking at each of the servo sectors, separately, the disk rotation speed when the track was recorded in the past does not always coincide with that when it is reproduced thereafter. Also, this difference comes to be a cause of errors in writing in the circumferential direction on the disk, and further results into a shift in the bit phase, between the tracks neighboring to each other, or the like, thereby lowering the so-called quality of the servo signal. In particular, with the magnetic disk apparatus having a small disk diameter, an inertia of the disk as a rotating body is also small, therefore an ill influence or effect due to this speed fluctuation comes to be remarkable.

BRIEF SUMMARY OF THE INVENTION

Then, according to the present invention, by taking the problems of the conventional arts mentioned above into the consideration, an object is to provide a magnetic disk apparatus, in particular, the magnetic disk apparatus having a self servo writing function therein, wherein writing errors in the circumferential direction are less in spite of fluctuation in the rotating speed of the disk, thereby being able to maintain the quality of the servo signals to be written into, and further a servo pattern recording method therefor.

One measure for reducing this error is to make the time period from a time when detecting a pattern up to a time when writing a next pattern, as short as possible. Then, according to the present invention, with positioning a plural number of patterns for use of timing detection within one (1) servo sector, the time period from the detection of the pattern recorded on the disk up to the writing of the next pattern is shorten, thereby providing a magnetic disk apparatus, which is hardly affected with an ill influence due to the fluctuation in the disk rotation speed when conducting servo writing, as well as, a servo pattern recording method for it.

According to the present invention, for accomplishing such the object as was mentioned above, first of all, there is provided a magnetic disk apparatus, comprising: a magnetic disk for recording information thereon; a head having a write element for use of recording information onto said magnetic disk and a read element for reproducing information from said magnetic disk; and an actuator for moving said head to a desired radial position on said magnetic disk, wherein on said magnetic disk is recorded a servo pattern for positioning said head on a recording surface thereof, and said servo pattern includes marker patterns for detecting passage time of said head, being disposed in a front and a rear of a burst pattern for detecting the radial position of said head, respectively, on a track extending in a circumferential direction thereof.

Also, according to the present invention, in the magnetic disk apparatus described in the above, preferably, the marker pattern of said servo pattern written on the recording surface of said magnetic disk is shifted with respect to the marker pattern of said servo pattern, which is written neighboring thereto in the circumferential direction of said magnetic disk, by a half of width thereof, on the position in a radial direction thereof, or, a distance between said servo patterns written on the recording surface of said magnetic disk in the circumferential direction is shorter than a length of said burst pattern.

In addition thereto, according to the present invention, for accomplishing the object mentioned above, there is also provided a servo pattern recording method for a magnetic disk apparatus, having a magnetic disk for recording information thereon; a head having a write element for use of recording information onto said magnetic disk and a read element for reproducing information from said magnetic disk; and an actuator for moving said head to a desired radial position on said magnetic disk, comprising the following steps of: recording a servo pattern for positioning of said head on a recording surface of said magnetic disk; recording marker patterns for detecting passage time of said head, disposing in a front and a rear of said burst pattern for detecting a radial position of said head, respectively, on a track in a circumferential direction, on said servo pattern recorded on the recording surface of said magnetic disk; and conducting a self servo write operation by said magnetic disk apparatus with using said servo pattern.

Also, according to the present invention, in the servo pattern recording method for a magnetic disk apparatus, as described in the above, preferably, the marker pattern of said servo pattern written on the recording surface of said magnetic disk is recorded by shifting it with respect to the marker pattern of said servo pattern, which is written neighboring thereto in the circumferential direction of said magnetic disk, by a half of width thereof, on the position in a radial direction thereof, when conducting said self servo write operation, or a distance is measured between the servo patterns neighboring to each other by reproducing two (2) of said servo patterns neighboring to each other in the circumferential direction, which are recorded on the recording surface of said magnetic dis, and upon basis of this distance measured is adjusted a timing of writing when recording a new servo pattern, when conducting said self servo write operation.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein.

DETAILED DESCRIPTION OF THE INVENTION

Figure 1:
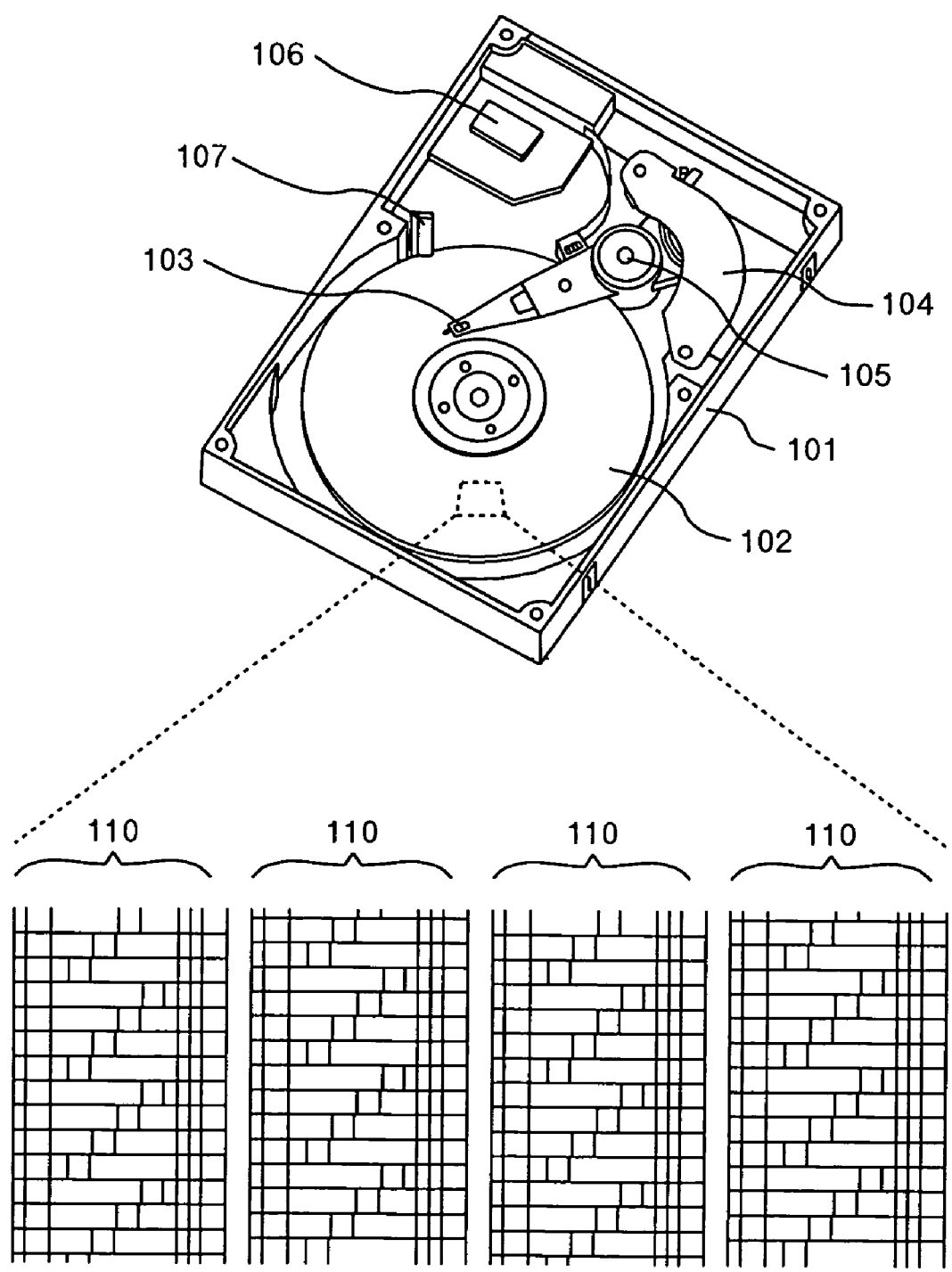
FIG. 1 is a view for showing an outer look of a magnetic disk apparatus, according to one embodiment of the present invention.

Hereinafter, embodiments according to the present invention will be fully explained by referring to the drawings attached herewith.

First, attached FIG. 1 shows a magnetic disk apparatus, according to an embodiment of the present invention, and it also shows servo patterns, which are recorded on a magnetic disk of that apparatus, in a lower portion thereof. Further, this FIG. 1 shows the apparatus under the condition where a cover member thereof is removed from, for seeing the structural elements therein, easily.

As is shown in the figure, the magnetic disk apparatus includes a casing 101 and comprises a disk 102, being a recording medium for recording information on the surface thereof, and a head 103 for recording and/or reproducing signals (i.e., the information) on/from said recording medium. This head 103 is pivotally supported being rotatable around a pivot 105, and is moved to an arbitrary radial position on the recording medium 102 mentioned above, due to the function of a voice coil 104 (hereinafter, being described by "VCM") as an actuator thereof. Also, this head 103 is driven through a recording/reproducing driver IC 106, thereby executing recording/reproducing operation thereof. However, this head 103 turns out on a ramp mechanism 107 locating in an outside of the disk 102 when conducting no recording/reproducing operation thereof; i.e., it is held thereon under the condition of being separated from the surface of the disk 102. Also, in the lower portion of FIG. 1, there are shown the servo signal (i.e., the servo patterns) 110, 110 . . . , which are written on the disk 102 with using the head 103 equipped with, in the magnetic disk apparatus mentioned above.

Figure 2:
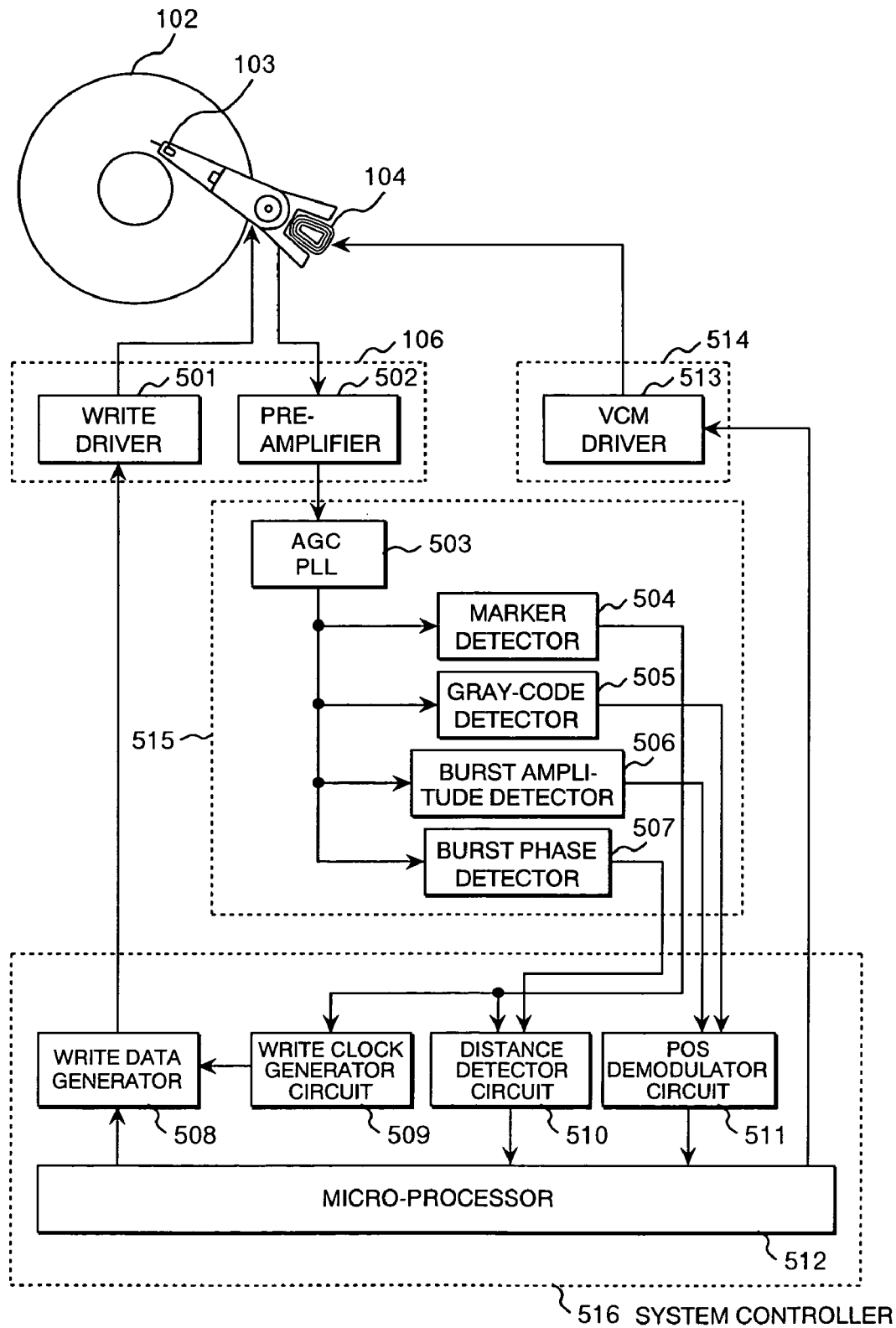
FIG. 2 is a block diagram of showing circuitry for a self-propagating operation and signal routes thereof, in the magnetic disk apparatus mentioned above, according to the present invention.

Next, attached FIG. 2 shows an example of, in particular, the circuitry structure for controlling the recording/reproducing operation in the magnetic disk apparatus, the structure of which was explained briefly in the above, through function blocks and signal routes provided between them.

Namely, as is shown in the figure, the head 103 mentioned above writes various kinds of signals on the disk 102, including the servo signals therein, upon the signals from a write driver 501, constructing the recording/reproducing driver IC 106 mentioned above, or it outputs signals read out from the disk 102 to a pre-amplifier 502. Also, to the VCM 104 for driving the head 103 is inputted a driving signal from a servo signal processor circuit 514, including a VCM driver 513 therein.

Also, for controlling the magnetic disk apparatus mentioned above, there is provided a so-called a system controller 516, and this system controller comprises: a microprocessor 512 for executing processing in accordance with a predetermined program(s); and further a write data generator portion 508 for transmitting write data to the write driver 501; a write clock generator circuit 509; a distance detector circuit 510 for measuring or detecting a distance between the servo sectors recorded; and a POS demodulator circuit 511, which will be explained about in details thereof, later. Further, the VCM driver 513 constructing the servo signal processor circuit 514 is controlled on the basis of the signals from the microprocessor 512 of the system controller 516 mentioned above.

Further, between the recording/reproducing driver IC 106 and the system controller 516 is provided a signal processing circuit 515. This signal processing circuit 515, as is shown in the figure, comprises: an AGC/PLL circuit 503, receiving an output of the pre-amplifier 503 for, thereby conducting gain adjustment and synchronization to recorded pattern; a marker detector 504 for detecting a marker, which will be explained later; a gray code detector 505 for detecting a gray code thereof; a burst amplitude detector 506 for detecting a burst amplitude thereof; and a burst phase detector 507 for detecting a burst phase thereof. Outputs of those respective detectors are inputted: e.g., an output of the marker detector 504 is inputted to the write clock generator circuit 509 constructing the system controller 516 and the distance detector circuit 510; outputs of the gray code detector 505 and the burst amplitude detector 506 to the POS demodulator circuit 511; and an output of the burst phase detector 507 to the distance detector circuit 510, respectively.

However, with the circuit structures for controlling the servo write operation of the magnetic disk apparatus mentioned above, a large portion thereof are common with those of the controller circuit of the magnetic disk apparatus as a product, therefore it is possible to build up the magnetic disk apparatus equipped with the self-servo write function, with a cheap manufacturing price thereof.

Next, explanation will be given on the self-servo write operation, which is executed in the magnetic disk apparatus, according to the present invention, being already explained about the detailed structure thereof in the above, by referring to FIG. 2, and also FIG. 3 given below, as well.

This FIG. 3 depicts the servo patterns on the disk 102 shown in FIG. 1 mentioned above, seeing from a reversed surface thereof. Thus, they are reversed in the direction of the right-hand side and the left-hand side, to the patterns shown in FIG. 1 mentioned above. This is for the purpose of bringing a relationship to be understandable, easily, in particular, the correspondences between the passage times of the head 103 and the time transitions of various signals, by displaying a boundary of the pattern propagation below, when directing a scanning direction of the head 103 from the left-hand side to the right-hand side. And, also in the figures hereinafter, a position on the vertical direction corresponds to the passage time of the head, when depicting the signals in the lower side of the patterns, aligning in parallel with.

As is apparent from the figure, within each pattern of servo sector 110 shown in FIG. 3(a), there are provided the following portions: e.g., at a top or head thereof, a preamble 207a for an automatic gain control (hereinafter, being described by "AGC") and synchronization of phase lock loop (hereinafter, being called by "PLL"); following thereto, a sector marker 208a; and further a burst pattern 210 for use in detections of a track ID code and a radial direction of the head, thereafter. This burst pattern, in this example, is divided into four (4) sections in the circumferential direction, and the burst of each section is offset in the radial direction of the disk, while having the same width in the radial direction of the disk.

And, according to the present invention, in addition to each of the constituent elements of the servo pattern mentioned above, the followings are also disposed thereafter: i.e., a second preamble 207b, at the last portion of the pattern of each the servo sector 110, and a second sector marker 208b, continuing to each other. Although those second sector markers are used upon recording of a new pattern(s), when conducting the self-propagating operation in the self servo write operation, however a method will be mentioned in the details thereof, later.

In the self servo write operation, a read element or device 103a attached at a tip portion of the head 103 mentioned above passes through the servo patterns 110 at the radial position shown in the figure (in more detail, on the boundary between the two (2) tracks neighboring to each other), with respect to the pattern of the servo sector 110 mentioned above, which has been already recorded on the disk 102. With this, from the read element 103a can be obtained such a reproduced signal as shown in FIG. 3(b). This signal reproduced is amplified in the pre-amplifier 502 within the recording/reproducing driver 106 shown in FIG. 2 mentioned above, and thereafter, it is transmitted to the servo signal processor circuit 515. And, in the servo signal processor circuit 515, an operation of signal demodulating is executed for detecting the position of the head 103 upon the basis of the waveform of the reproduced signal 201 mentioned above, when a servo signal process enable signal, which is shown in FIG. 3(b) mentioned above by a reference numeral 202, turns to be active (i.e., a "high" in the condition thereof).

The signal demodulating operation for position detection of the head; thus, the time transitional condition, in demodulation processing of the reproduced signal, is shown in FIG. 3(b) mentioned above, by a reference numeral 203. First, at a stage when the read element 103a passes through the preamble 207a, the AGC/PLL circuit 503 shown in FIG. 2 mentioned above operates to adjust the gain, so that the amplitude of the reproduced waveform 205a comes up to an appropriate level, and further locks the phase of the reproduced waveform to that of the PLL circuit (211).

Next, in a stage when the read element 103a passes through the sector marker 208a, the maker detector 504 captures the waveform at the gain and the phase thereof, being adjusted thereof, and as a result of this, it detects a bit pattern 206a of the sector marker (212). Following thereto, in a stage when the read element 103a passes through the track ID code 209, the gray code detector 505 reads out the track ID code (213). Next, in a stage when the read element 103a passes through the burst pattern 210, the burst amplitude detector 506 detects the reproduction amplitude of the burst pattern 210 (214). And, according to the present invention, as was mentioned in the above, since the second preamble 207a and the second sector marker 208b are disposed or located at the last portion of the pattern of each the servo sector 110, continuing thereto, therefore, again, the phase of the reproduction waveform is locked to the phase of the PLL circuit (see the reference numeral 211 mentioned above), and further, the bit pattern 206a is detected of the sector marker (see the reference numeral 212 mentioned above).

In the reproduced signal demodulation process 203 mentioned above, the track ID, which is detected in the reading out of the track ID (213) and the amplitude of the reproduced signal 201, which is detected in the amplitude detection (214) mentioned above, reflect the position in the radial direction of the read element 103a thereupon. Then, with using such results of those detections, it is possible to produce a position signal indicative of the position of the head in the radial direction.

And, as was already mentioned in the above, also the second preamble 207b and the second sector marker 208b are disposed or located, repetitively, at the last portion of the pattern, together with the preamble 207a and the sector marker 208a, which are disposed at the head of the pattern, as the pattern for use of timing detection for writing on the disk, therefore, with using those, it is possible to shorten a time dilation from when detecting (i.e., reading or reproducing) the pattern up to when newly writing a pattern next. Namely, it is possible to suppress the causes of errors on writing in the circumferential direction on the disk due to the fluctuation of rotation speed of the disk, thereby preventing the servo signals from lowering in the quality thereof, such as, causing of the shifting in the bit phase, in particular, between the tracks neighboring with each other, for example.

Figure 3A:
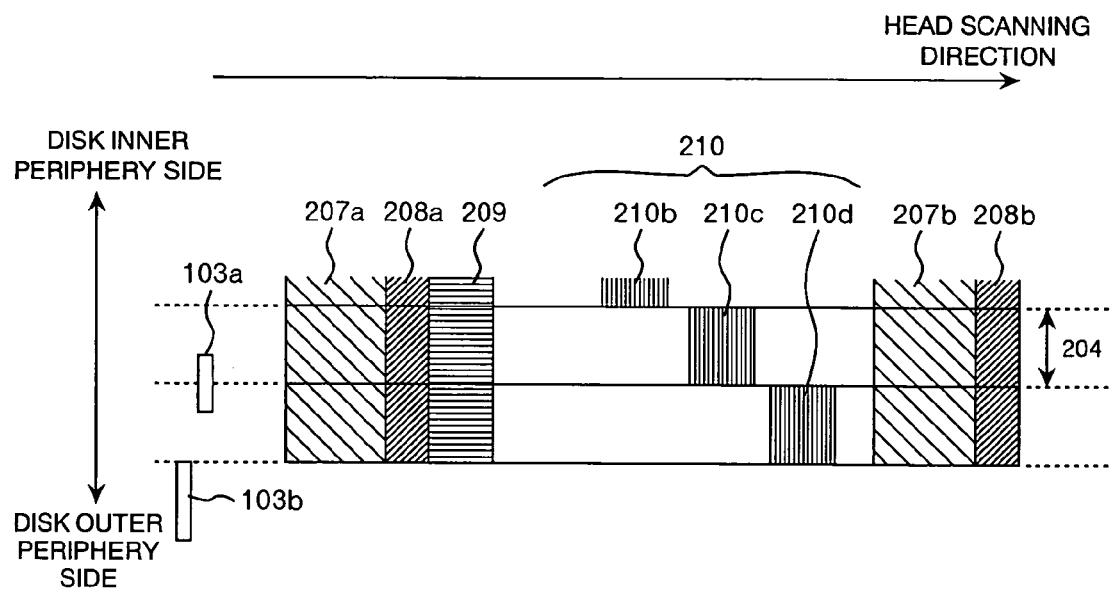
FIGS. 3(a) and 3(b) are views for showing a layout within a sector of the servo pattern, in the magnetic disk apparatus mentioned above, according to the present invention.
Figure 3B:
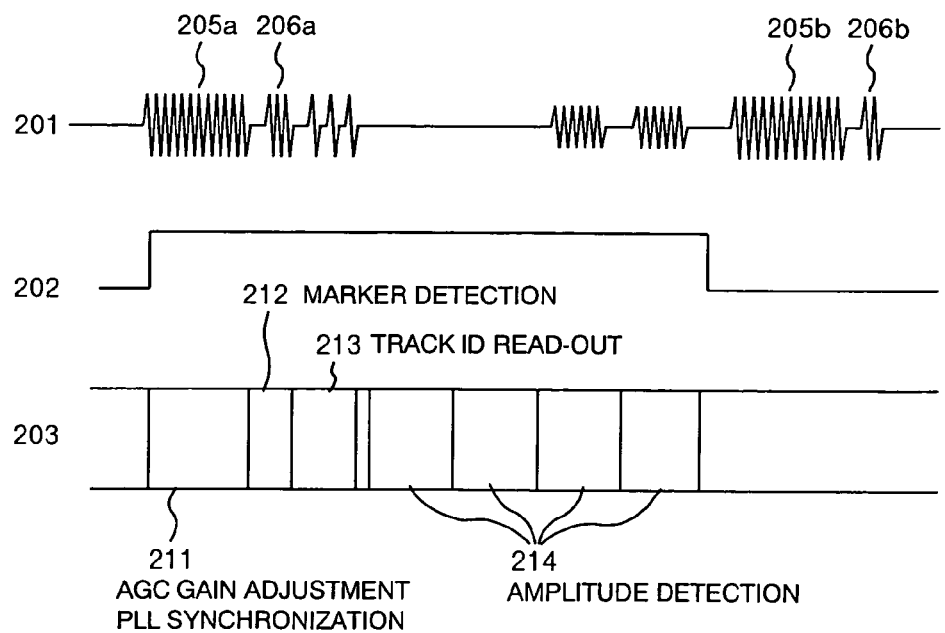

However, in the case of the pattern shown in FIGS. 3(a) and 3(b) mentioned above, the width of the burst 210 offsetting in the radial direction is only for one servo track. In such the case, depending upon the positional relationship between the radial potion of the read element 103a and the burst pattern (in the case of the figure, the burst patters 210c and 210d are neighboring with each other, not only the radial direction, but also in the circumferential direction, and then the read element 103a passes on the boundary of those patterns); therefore there may be a case where a dead zone is generated in the position detection (namely, on the reproduced signal 201 shown in FIG. 3(b), and then signals cannot be separated from, corresponding to the burst patterns 210c and 210d). Therefore, according to the present embodiment, the burst patterns 210 of the servo sectors are disposed, being different from in the radial direction but neighboring in the circumferential direction thereof each other, while shifting them from each other, and the position signal is produced by using the amplitudes of the burst signals (in this case, eight (8) pieces thereof) disposed in both of the sectors, bringing the servo sectors 210 continuous in the circumferential direction into one (1) set thereof, thereby enabling to obtain the position signal, being continuous in the radical direction and superior in a linearity thereof.

The demodulating operation of the position signal mentioned above is executed in the POS demodulator circuit 511 shown in FIG. 2 mentioned above. And, with using this position signal obtained, the microprocessor 512 mentioned above calculates out an amount of operation to be conducted by the actuator, by executing a control calculation for position g of the head, and it outputs a result thereof to the VCM driver 513. With this, the VCM driver 513 drives the VCM 104 mentioned above, thereby conducting the servo control for positioning the head 103.

Next, explanation will be given on so-called the self-propagating operation, in which the patterns are spread by recording new patterns on the disk 102, as a portion of the self-servo operation, while controlling the positioning of the head 103 through the servo patterns, the details of which was shown in FIGS. 3(a) and 3(b) mentioned above, by referring to FIGS. 4(a) and 4(b) attached herewith.

Figure 4A:
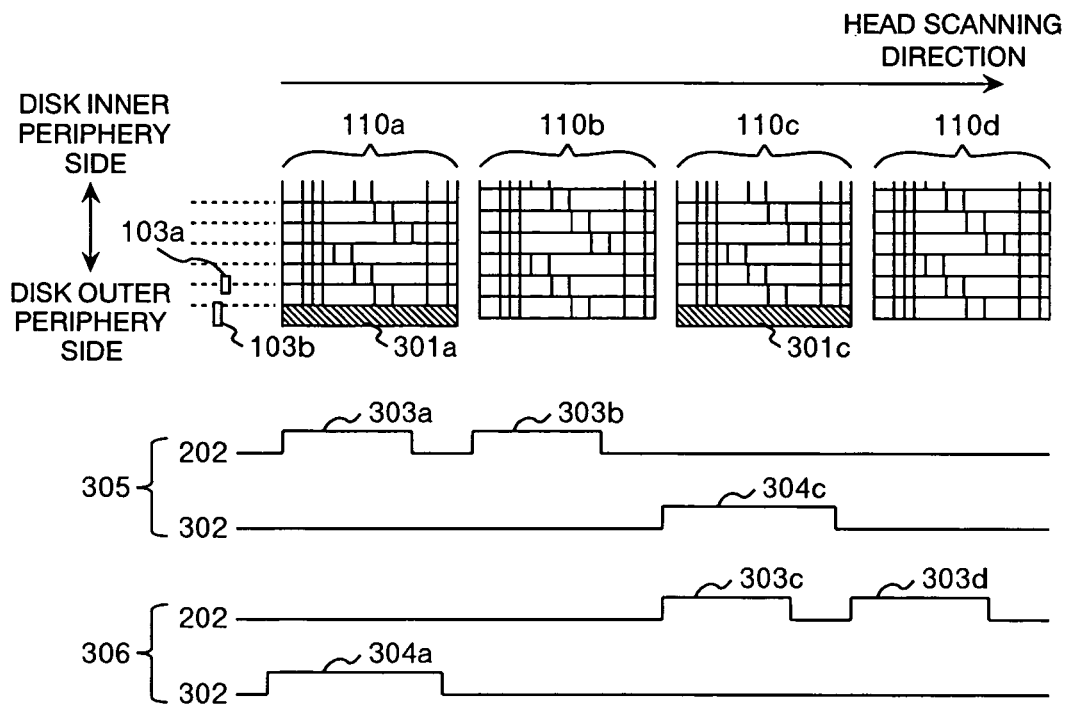
FIGS. 4(a) and 4(b) are views for showing an example of an operation of recording new patterns when performing the self-propagating operation, in the magnetic disk apparatus mentioned above, according to the present invention.
Figure 4B:
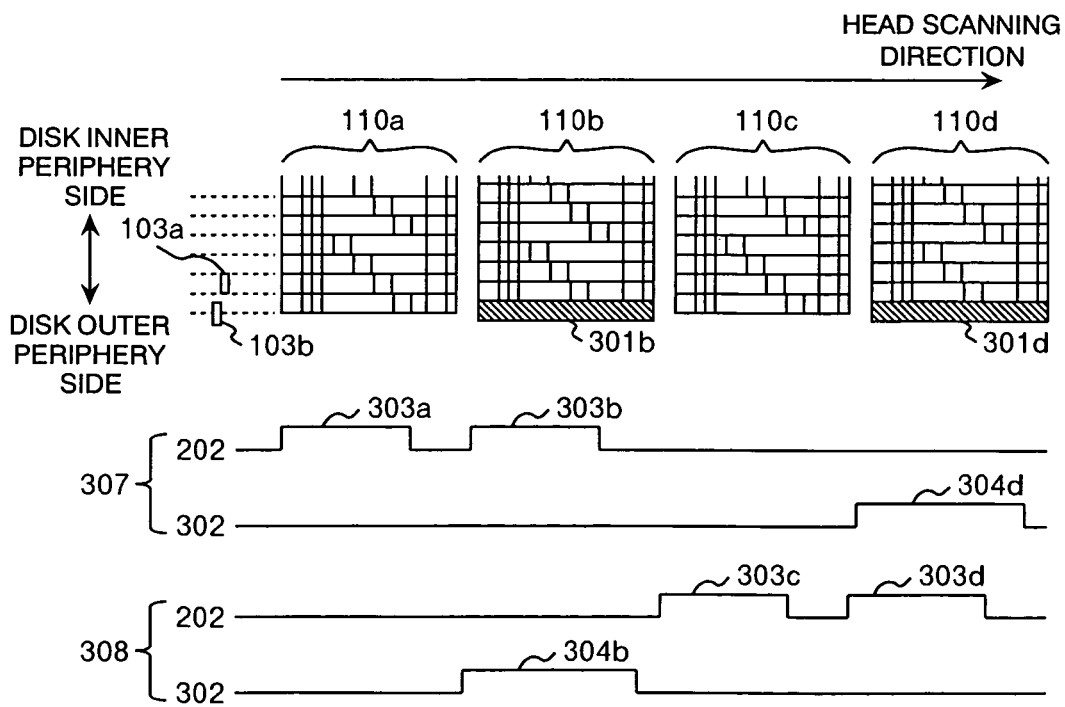

However, in those FIGS. 4(a) and 4(b), only four (4) servo sectors are picked up, to be depicted therein, lying on the same circumference on the disk 102, for explaining the recording operation of the servo patterns. Further, FIG. 4(a) is a view for showing the operation of recording new blocks 301a and 301c on the boundary portion of the propagation where the patterns of the servo sectors 110a and 110c are written, spreadingly. Also, the other FIG. 4(b) is a view for showing the operation when recording new blocks 301b and 301d on the boundary portion of propagation between the servo sectors 110b and 110d.

Herein, it is assumed that "block" indicates a pattern for one (1) servo sector, which can be recorded by only one (1) time of write operation. Also, "self-propagation or self-propagating" according to the present invention means the operation of writing the patterns, spreading into an outer periphery direction, by conducting the two (2) operations shown in FIGS. 4(a) and 4(b) mentioned above, alternatively, while shifting or moving the head 103 into an outer periphery side of the disk 102.

First, in the operation shown in FIG. 4(a) mentioned above, a servo process enabling signal 202 when recording the block 301c and a write gate signal 302 are shown by a reference numeral 305 in the figure, collectively. Thus, so as to conduct the detection of the head position for the positioning control, as indicted by reference numerals 303a and 303b in the figure, by turning the servo processor circuit 515 mentioned above (see in FIG. 2 mentioned above) into active two (2) times, the amplitude of the burst patterns of the two (2) servo sectors 101a and 101b. Then, after passing through those servo sectors 110a and 110b, the record element 103b of the head 103 writes a pattern of the block 301c, by turning the write gate signal 302 to be active, in a section when passing through the servo sector 110c.

Herein, in FIG. 4(a) mentioned above, though only four (4) servo sectors are depicted in the head scanning direction, however in a region not depicted in this figure, the servo sectors are disposed or located in a number of several hundreds on one (1) round of the same track, in the similar manner as was mentioned above. And, when writing on the block 301c mentioned above, recording is conducted for one (1) round of the track, by conducting the similar operation, repetitively, for each of the four (4) sectors. And, after completing the recording for this one (1) round, further a block 301a is recorded under the condition where the head 103 is on the position the same servo track. The servo process enable signal 202 and the write gate signal at this time are shown in FIG. 4(a), by a reference numeral 306, collectively. However, in this instance, the position detection of the head for conducting the positioning control is conducted during the sectors 303c and the 303d, and the patterns are written into the block 301a during the section 304a.

After recording the both blocks 301a and 301b on an entire of one (1) round on the disk 102 mentioned above, in the manner as was explained above, next the head 103 is moved into an outer periphery side by only 0.5 servo track, thereby conducting recording on the blocks 301b and 301d. A positional relationship between the record/read elements 103a and 103b and the patterns in this instance is shown in FIG. 4(b).

Namely, detection is made on the head position during the active sections 303a and 303b of the servo process signal, which are shown by the reference numeral 307 in the figure, in the similar manner when conducting the recording on the blocks 301a and 301c mentioned above, and during the section 304d where the write gate is active, recording is conducted on the block 301d. Following thereof, during the sections 303c and 303d where the servo process signal is active, shown by a reference numeral 308 in the figure, detection is conducted on the head position, and further during the section 304b where the write gate is active, recording is conducted on the block 301d. After completing the recording on both of the blocks 301a and 301b in an entire of one (1) round in this manner, the head 103 is moved into the outer periphery side by 0.5 servo track, and again, recording is conducted on the blocks 301a and 301c (see FIG. 4(a) mentioned above). According to the steps mentioned above, both can be achieved; i.e., while conducting the positioning of the head (i.e., the record/read elements 103a and 103b) without causing interference between the reproducing operation and the recording operation conducted by means of the head 103, and at the same time is conducted the writing of the new patterns.

Hereinafter, recording of the new patterns is repeated, in accordance with the processes mentioned above, but exchanging the burst patterns 210a to 210d, accompanying with the movement of the head in the radial potion thereof, so that it does not overlap with the burst pattern, which was already recorded on the block neighboring therewith, as is similar in the conventional art.

As was explained in the above, according to the present invention, the second preamble 207b and the second sector marker 208b are disposed, also at the last portion thereof, together with the preamble 207a and the sector marker 208a, which are disposed at the head of the pattern, as the pattern for use in detection of timing, in each of the servo sectors recorded and disposed on the disk 102, in the magnetic disk apparatus having the self servo writing function. And, this second sector marker is used upon recording the pattern newly, when conducting the self-propagating operation in the self-servo write operation.

However, as was mentioned in the above, the rotation of the disk fluctuates in the speed thereof, and therefore the rotation speed of the disk at the time when recording the pattern is not always coincident with the rotation speed at the time when trying to write the pattern newly next. However, as was mentioned in the above, the second preamble 207b and the second sector marker 208b are disposed, also at the last portion thereof, together with the preamble 207a and the sector marker 208a, which are disposed at the head of the pattern, as the pattern for use in detection of timing, and with using those, it is possible to shorten the time period from the time when detecting (i.e., reproducing or reading) the pattern up to the time when writing the pattern newly next. Namely, the cause of errors on writing in the circumferential direction of the disk, due to the fluctuation of the rotation speed of the disk, can be suppressed, thereby protecting the servo signals from lowering in the quality thereof, such as, causing the shift in the bit phase between the tracks neighboring with each other, etc., for example. In other words, it is possible to provide the magnetic disk apparatus, hardly receiving an ill influence from the fluctuation on the rotation speed of the disc when concocting the servo write operation. For this reason, according to the present invention, an effect can be obtained remarkably, in particular, when it is applied into the magnetic disk apparatus, having a disk of a small diameter.

Also, the servo sectors 110 for use in positioning of the head, in a general magnetic disk apparatus, come from several tens to several hundreds in the number thereof (for example, two hundreds of pieces) per one (1) round, normally. On the contrary to thereto, in the magnetic disk apparatus according to the present invention mentioned above, recording of the pattern is conducted at the same time, by reproducing the servo sector 110 mentioned above; e.g., the second preamble 207b and the second sector marker 208b, which are recorded at the last portion of the sector pattern locating just in front thereof, so as to use the timing obtained from, when conducting the self servo write function. With doing this, it is possible to write in the next pattern newly, without receiving an ill influence from the fluctuation in the rotation speed of the disk, but with shortening the time length therebetween. As a result of this, the servo sectors are disposed on all around of one (1) round of the track, closing in the distance therebetween. For this reason, comparing to the number of the servo sectors in the normal product, the servo sectors are disposed in the number thereof, being large from several times to ten and several times to that. However, relating to this aspect, since it gives a good effect, in particular, from a viewpoint of high accuracy of the servo control for head positioning, and in an actual use of the magnetic disk apparatus, while reaming a part of those servo sectors, but those unnecessary may be deflected from, thereby they can be used as recordable areas for information.

Next, explanation will be given on other example of the so-called the self-propagating operation, according to the present invention; i.e., recording new patterns while controlling the positioning of the head through the pattern recorded in advance, by referring to FIGS. 5(a) and 5(b) attached herewith. Further, those FIGS. 5(a) and 5(b) depict two (2) of the servo sectors recorded on the same circumference of the disk 102 mentioned above.

Figure 5A:
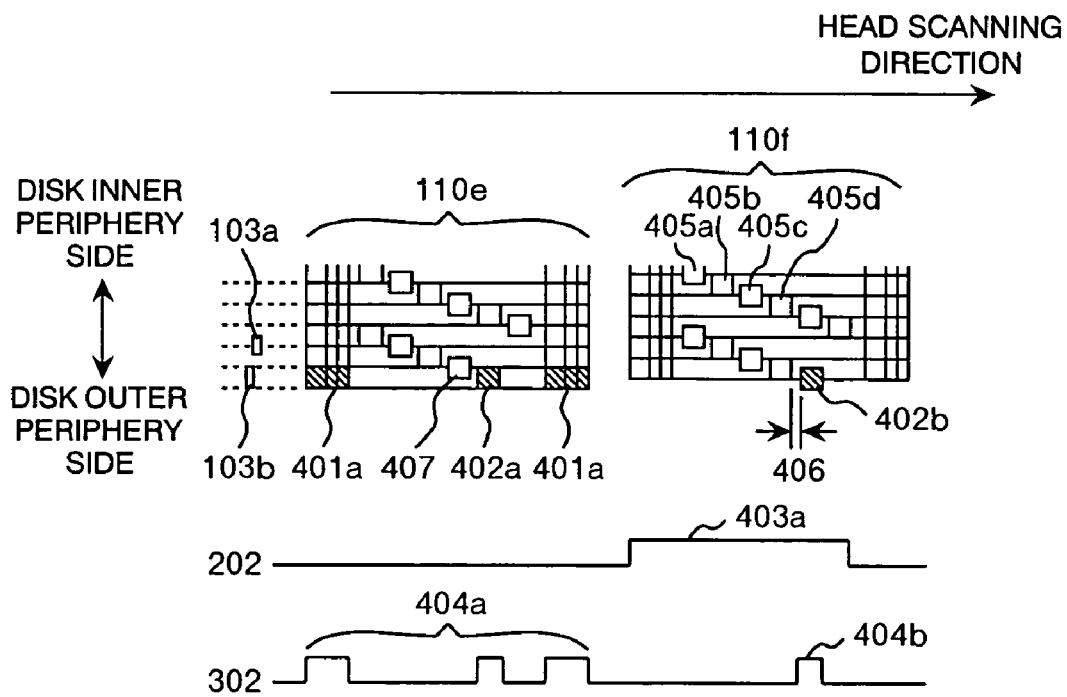
FIGS. 5(a) and 5(b) are views for showing other example of an operation of recording the new patterns when performing the self-propagating operation, in the magnetic disk apparatus mentioned above, according to the present invention.
Figure 5B:
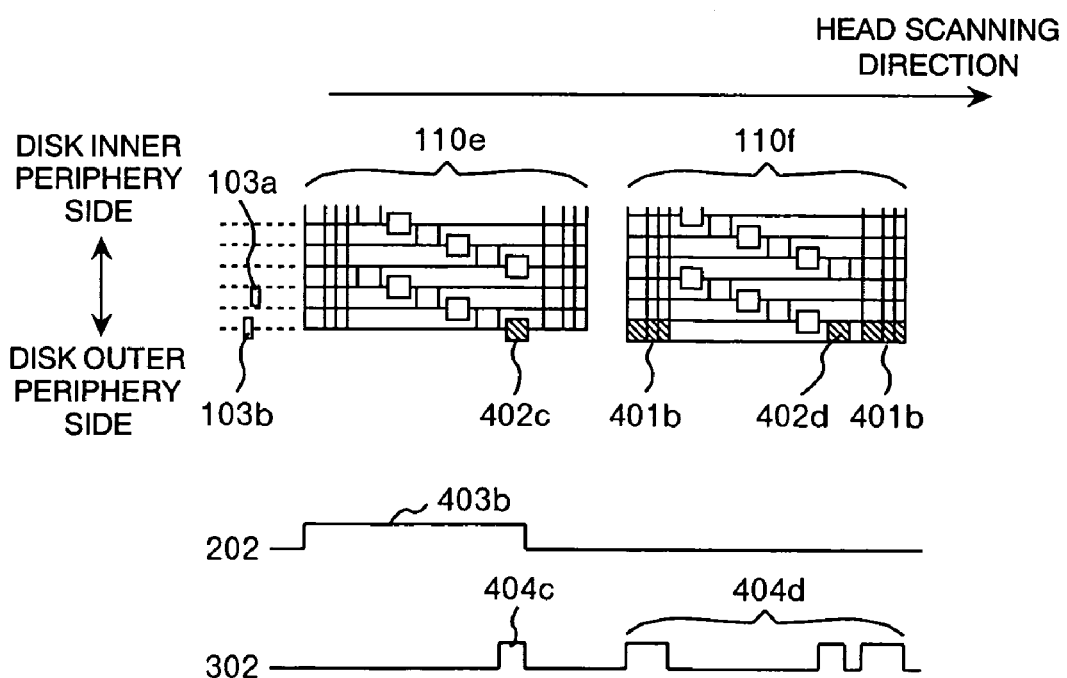

First, FIG. 5(a) shows the operation, as apparent from the figure, in particular, in a case when recording a new burst 402a and a block 401a other than this burst, on the propagation boundary portion of the servo sector 110e (in the figure, a lower portion of the servo sector 110e), while recording a burst 402b on the propagation boundary portion of the servo sector 110f. And, FIG. 5(b) shows the operation, in particular, in a case when recording a new burst 402a on the propagation boundary portion shifting by 0.5 servo track comparing to that shown in the FIG. 5(a) mentioned above, while recording a new burst 402b and a block 401b other than the burst on the propagation boundary portion of the servo sector 110f.

The embodiment shown in FIGS. 5(a) and 5(b) differs from that shown in FIGS. 4(a) and 4(b) mentioned above in the following aspects. First of all, each of the servo sectors has six (6) bursts, respectively, and a distance offsetting the burst in the radial direction within one (1) sector is a half (½) of the servo track. According to this, differing from the embodiment mentioned above, it is possible to detect the position of the head upon reproduction of only one (1) servo sector. Also, a second aspect is in that the position of each burst is same in the radial direction between the servo sectors neighboring with each other, and therefore it is possible to record new bursts on all the sectors for one (1) round through the write operation of one (1) round.

Hereinafter, explanation will be given on other operation, according to the present invention, comparing between the servo process enable signal 202 and the write gate signal 302, which are shown in the lower portions of FIGS. 5(a) and 5(b).

In FIG. 5(a), all the blocks are recorded in the servo sector 110e, while only the burst in the servo sector 110f. In the case of this embodiment, since the distance of offsetting of the burst in the radial direction is a half (½) of the servo track, as is in the embodiment mentioned above, when recording on the servo sector 110e, the bursts 407 recorded in advance are deleted, if conducting the write operation is conducted on the block as a whole as was mentioned above. For this reason, the write gate is turned to OFF at the portions other than the burst 402a to be written, as is indicted by a section 404a, thereby inhibiting deletion through writing thereon. On the other hand, on the servo sector 110f, for detection of position of the head, the servo process enable signal 202 is turned to be active during a section 403 from the sector head to the last burst. And, the write gate signal 302 is turned to be active only during a section 404 of the burst to be recorded newly, thereby recording the burst 402b thereon. Generally, in the head used in the magnetic disk apparatus, it is impossible to conduct the reproducing operation during the recording operation. For this reason, during the section of the burst 402b to be recorded, the read element 103a cannot to read out the amplitude of the burst.

However, such the problem as was mentioned above can be avoided by selecting the offsetting between the read element 103a and the record element 103b in the radial direction, appropriately. However, though depending upon the pitch of the servo track, since the number of pieces of the bursts, on which the read element can cover at a certain radial position, is from three (3) to four (4), then it is not always true that information of all bursts are necessary. Then, in a case where an amount of offsetting between the read element 103a and the record element 103b in the radial direction is larger than that for one (1) servo track, for example, when they offsetting by 1.5 servo tracks, as shown in FIG. 5(a), the bursts are three (3), i.e., 405a, 405b and 405c, on which the read element passes through when recording the new burst 402b, therefore there is no chance to overlap with. Then, the detection of position of the head can be made, if possible to read out it during the section of the bursts 405a, 405b and 405c, even though being impossible to read out it in the section of the burst 402b.

In case of recording only one (1) burst among of them while conducting the position detection of the head with using the servo sector, as was mentioned above, it is necessary to complete exchanging of the head from the reproducing operation to the recording operation, or exchanging on the contrary, during the sections locating between the burst to be recorded and the bursts in a front and a rear thereof. Then, for the section 406 between the front and the rear of each burst, it is necessary to be ascertained a length enabling to absorb a time for exchanging operation mode of the recording/reproducing drive 106 and a time shift caused due to the distance between the read element 103*a* and the record element 103*b* in the circumferential direction. Further, the operation, which is conducted in the servo sectors 110*e* and 110*f* mentioned above, will be conducted on all of the sectors of one (1) round of the disk, in the similar manner.

Next, explanation will be given on an operation, in particular, in case when recording while moving the head 103 into the outer periphery side by 0.5 servo track, by referring to FIG. 5(*b*). However, under the condition before conducting the pattern writing, in this FIG. 5(*b*), portions other than the bursts are recorded up to the position, being on the outer periphery side by 0.5 servo track from the servo sector 110*f*.

Then, on the contrary to when shown in FIG. 5(*a*), in the servo sector 110*e*, only the burst is recorded by detecting the position of the head, while in the servo sector 110*f* is conducted recording on the block as a whole. The operation in each of the sectors is same to the above, but except for that the operations thereof are exchanges between the servo sectors 110*e* and 110*f*. And, the steps mentioned above are repeated, while moving the head by 0.5 servo track, thereby enabling to propagate the servo pattern. However, in the case of the other embodiment, it is possible to write the patterns of all sectors by one (1) round of the head scanning.

In the above, explanation was given on the steps of the so-called self-propagating operation; i.e., recording new patterns while controlling the positioning of the head through reproduction of the servo sectors, at the same time. Also, when recording the new patterns actually, it is necessary to fit the bit phase, between the pattern recorded in advance and that to be written newly on the tracks neighboring with each other.

Then, explanation will be given on the detailed operation of controlling the timing on writing for achieving such the requirement hereinafter, by referring to FIG. 6 attached herewith. However, this FIG. 6 is a view for showing the transition of time of various kinds of control signals, when assuming the recording of the block 301*c*, as an example of the writing operation of the pattern.

Figure 6:
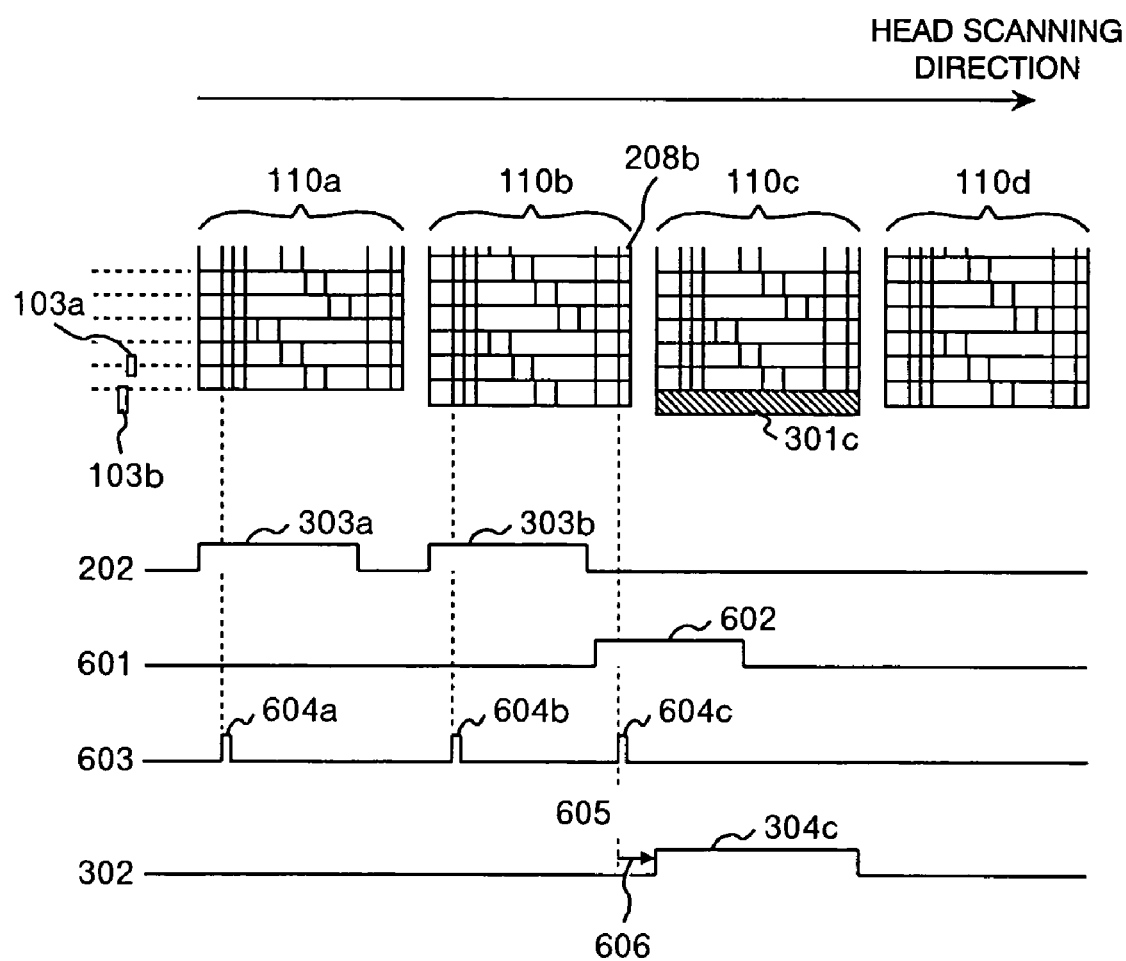
FIG. 6 is a view for showing a method for adjusting a timing for recording upon recording the new pattern, when performing the self-propagating operation, in the magnetic disk apparatus mentioned above, according to the present invention.

In FIG. 6, for recording the block 301*c*, after completing the demodulating operation in the sections 303*a* and 303*b*, further, the marker detection enable signal 601 is turned to active during the section 602. The marker detection enable signal operates the signal processor circuit 515, being same to the servo proves enable signal 202, however no detection is conducted on the burst, but only the detection of the marker. Thus, in this aspect, it differs from the servo process enable signal 202 in the embodiment mentioned above.

Next, when the marker detector 505 detects the sector marker 208*b* locating at the last portion of the sector 110*b* upon the marker detection enable signal, then the marker detection signal 603 is turned to be active. Also, upon receipt of a rise-up 604*c* of this marker detection signal as a trigger, the write clock generator circuit 509 shown in FIG. 2 initiates the operation thereof. Upon the basis of the timing of the clock signal generated in the write clock generator circuit 509, recording current data to be written newly is produced in the write data generator potion 508, and data is written into through the write driver 501. Although the timing of writing this pattern must be controlled, so that the bit pattern of the block 301*c* fits to the pattern neighboring therewith in the phase of bit, however this can be achieved by adjusting a time period 606 from the trigger time 605 in FIG. 6 up to the time when the write current 302 is transmitted.

According to this method, since the write operation is conducted just after detection on the pattern phase of the medium upon the second sector marker, the time period comes to be very short, receiving the ill influence due to the fluctuation on the rotation speed of the disk 102, therefore it is possible to build up a system, hardly receiving the ill influence of the fluctuation of the speed.

However, for determining the time period 606 up to when transmitting the write current, it is necessary to know the distance between the each of servo sectors, in FIG. 6 mentioned above. In particular, for conducting the self-propagating operation continuously, errors are accumulated when repeating the propagation, and for this reason, the phase error comes to be large between the tracks neighboring with each other. Then, it is necessary to suppress the phase error between the neighboring tracks due to such the error, and for this, it is necessary to measure the distance between each of the servo sectors, thereby to adjust the delay time 606 of the write current, finely.

Figure 7:
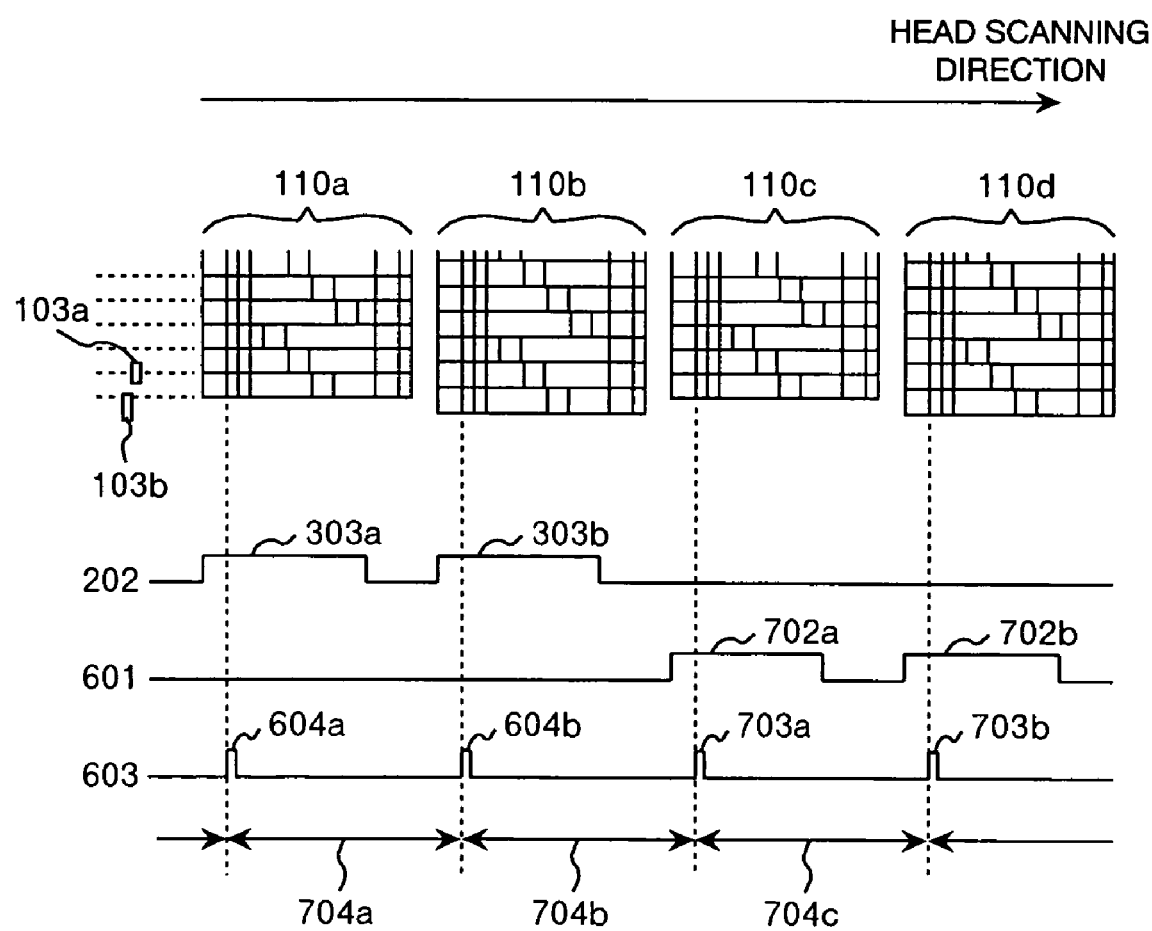
FIG. 7 is a view for showing an example of a method for measuring a distance between the servo sectors, when performing the self-propagating operation, in the magnetic disk apparatus mentioned above, according to the present invention.

However, explanation will be given on the method for measuring the distance between the servo sectors mentioned above, by referring to FIG. 7 attached herewith. In this FIG. 7 shows time sequential transitions of various kinds of control signals in relation therewith, which are used for conducting the measurement on the distance between the servo sectors, in the stage before new blocks are recorded on the sectors 110*a* and 110*c*.

For measuring the distance between the servo-sectors, after completing the demodulating operation of the sectors 303*a* and 303*b*, further the maker detection enable signal 601 is turned to active during the sections 702*a* and 702*b*. With this operation, the servo signal processor circuit 514 (see FIG. 2 mentioned above) detects, not only the servo sectors to be used for position detection of the head, such as, the patterns 110*a* and 110*b*, for example, but the sector markers 208*a*, which are disposed at a side of heads of all the servo sectors, also further including the patterns 110*c* and 110*d* therein.

As a result of this, when demodulating the servo sectors for the position detection of the head, such detection flags as shown by reference numerals 703*a* and 703*b* therein can be outputted during the time period therebetween, in addition to the detection flags 604*a* and 604*b* obtained from detection signals of the markers. Namely, corresponding to the positions of the sector markers 208*a* of all servo sectors, a rise-up event is generated on the marker detection signal. Then, the time distance between those rise-up events indicated by reference numerals 704*a*, 704*b* and 704*c* in FIG. 7 in the distance detector circuit 510 provided within the system controller 516 shown in FIG. 2 mentioned above, thereby enabling the measurement of distance between the servo sectors recorded on the disk 102.

Further, explanation will be given on other method for measuring the distance between the servo sectors mentioned above, by referring to FIG. 8 attached herewith. However, this FIG. 8 shows the method for measuring the servo sectors 110*b* and 110*c*, as the other method for measuring the distance between the servo sectors.

Figure 8:
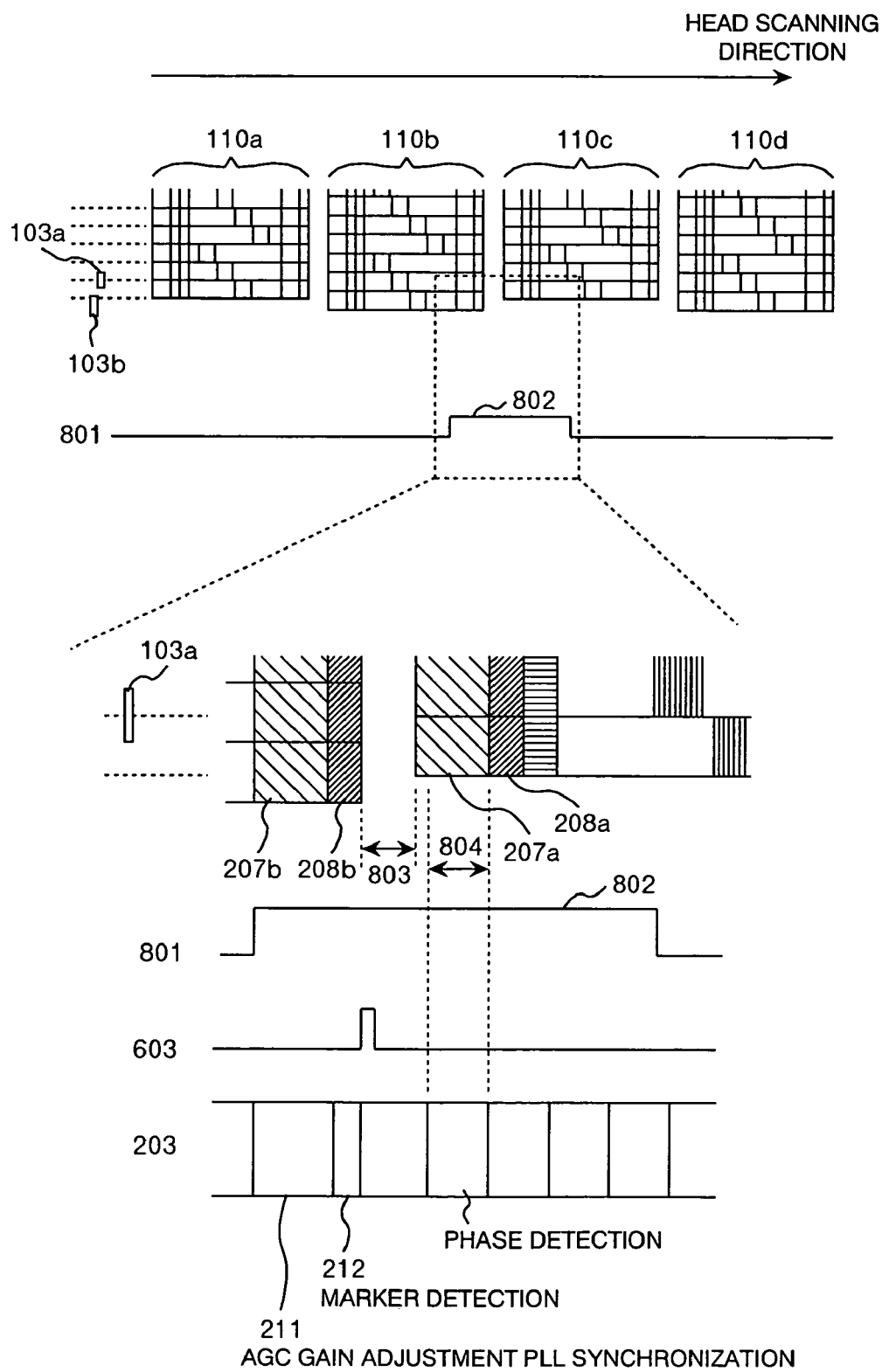
FIG. 8 is a view for showing other example of the method for measuring a distance between the servo sectors, when performing the self-propagating operation, in the magnetic disk apparatus mentioned above, according to the present invention.

In FIG. 8, for measuring the distance between the servo sectors 110*b* and 110*c*, the phase detection enable signal 801 is turned to active during the section 802 bridging over the servo sectors 110*b* and 110*c*. Further, operation during this section 802 is shown in a lower portion, while being enlarged thereof.

The phase detection enable signal is turned to be active from the vicinity of the head portion of the second preamble 207b of the servo sector 11b locating on a front side where the distance is measured. With this operation, the servo signal processor circuit 514 detects the sector marker 208b at the last portion of the servo sector 110b, after conducting the gain adjustment by the AGC and the synchronization of the phase by the PLL to the second preamble, as similar to the normal detecting operation of the head position. Continuing the demodulating operation as it is, the read element 103a moves from the servo sector 110b to that 110c. In this instance, normally, the read element 103a reproduces the preamble the head of the next servo sector 110c, during the section 802 for detecting the amplitude of the burst signal. However, this preamble 207a is a pattern of "All-1 (all are one (1)" of the servo signal frequencies, being similar to the burst portion, as shown in the reference numeral 205a in FIG. 3 mentioned above, and from the signal obtained from reproducing this, the phase of the pattern can be detected, with using the burst phase detector 507 within the servo signal processor circuit 514 shown in FIG. 2 mentioned above. However, in this instance, since this phase detection can be achieved by measuring the phase of the preamble 207a of the servo sector 110c upon the basis of the sector marker 208b of the servo sector 110b, then the result obtained with this is reflecting the distance 803 between the servo sectors 110b and 110c. Further, this burst phase detector 507 can be achieved, easily, with using the digital Fourier conversion, for example, in a form to be applicable to the product.

Also, for conducting the method mentioned above, it is apparent the servo pattern format must be designed to be a nominal distance, so that the section 802 for detecting the pattern phase can be received within the preamble 207a.

However, with the method with using the phase detection mentioned in the above, it is possible to detect also a fluctuation of the distances between the servo sectors, such as, being smaller than $1/100$ of the waveform frequency of the servo signal, at very high accuracy. But, the region where the phase detection can be made with this is restricted to within the region of the waveform frequency of the servo signal. However, since the phase error between the neighboring tracks to be controlled according to the present invention is for the purpose of continuing the self-propagating operation, normally, and it never be larger than the waveform frequency of the servo signal, as far as in this sense, it does not matter with.

As was fully explained in the above, according to the magnetic disk apparatus and the servo pattern recording method therefor, according to the present invention, it is possible to shorten the time period from the time of detection the patterns, which are written on the rotating magnetic disk of the medium, previously, up to the time when a new pattern is written into, and in particular, when conducting the self servo write operation, it hardly receive the ill influence due to the fluctuation of rotation speed of the disk. For this reason, it is possible to provide the magnetic disk apparatus and the servo pattern recording method there for, enabling to maintain the written servo signals written to be high in the quality thereof. Additionally, according to the present invention, mentioned above, almost of the circuit structures for controlling the servo write operation in the magnetic disk apparatus are common with the control circuits of the magnetic disk apparatus as the product, and therefore it is possible to build up the magnetic disk apparatus equipped with the self servo write function, cheaply.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. A servo pattern recording method for a magnetic disk apparatus, having a magnetic disk for recording information thereon; a head having a write element for use of recording information onto said magnetic disk and a read element for reproducing information from said magnetic disk; and an actuator for moving said head to a desired radial position on said magnetic disk, comprising the following steps of:
    recording a servo pattern for positioning of said head on a recording surface of said magnetic disk;
    recording marker patterns for detecting passage time of said head, disposing in a front and a rear of a burst pattern for detecting a radial position of said head, respectively, on a track in a circumferential direction, on said servo pattern recorded on the recording surface of said magnetic disk; and
    conducting a self servo write operation by said magnetic disk apparatus using said servo pattern;
    wherein a distance is measured, in the circumferential direction, between two neighboring servo patterns which are recorded on the recording surface of said magnetic disk, and wherein a time period recording a new servo pattern is adjusted based on the measured distance, when conducting said self servo write operation.

2. A servo pattern recording method for a magnetic disk apparatus, as described in the claim 1, wherein the marker pattern of said servo pattern written on the recording surface of said magnetic disk is recorded by shifting it with respect to the marker pattern of said servo pattern, which is written neighboring thereto in the circumferential direction of said magnetic disk, by a half of width thereof, on the position in a radial direction thereof, when conducting said self-servo write operation.

\* \* \* \* \*